US012696369B2

(12) United States Patent
Cantzler et al.

(10) Patent No.: US 12,696,369 B2
(45) Date of Patent: Jul. 28, 2026

(54) PLASMA DEVICE

(71) Applicants: BSH Hausgeraete GmbH, Munich (DE); terraplasma GmbH, Garching (DE)

(72) Inventors: Maximilian Cantzler, Garching (DE); Piotr Cyran, Debica (PL); Florian Michl, Trostberg (DE); Tobias Wende, Prien (DE)

(73) Assignees: BSH Hausgeräte GmbH, Munich (DE); terraplasma GmbH, Garching (DE)

( * ) Notice: Subject to any disclaimer, the term of this patent is extended or adjusted under 35 U.S.C. 154(b) by 1106 days.

(21) Appl. No.: 17/778,106

(22) PCT Filed: Nov. 10, 2020

(86) PCT No.: PCT/EP2020/081606
§ 371 (c)(1),
(2) Date: May 19, 2022

(87) PCT Pub. No.: WO2021/099181
PCT Pub. Date: May 27, 2021

(65) Prior Publication Data

US 2022/0418075 A1 Dec. 29, 2022

(30) Foreign Application Priority Data

Nov. 19, 2019 (EP) .................................... 19210075
May 18, 2020 (DE) ..................... 10 2020 206 222.6

(51) Int. Cl.
*H05H 1/24* (2006.01)
*D06M 10/02* (2006.01)

(52) U.S. Cl.
CPC ........ *H05H 1/2406* (2013.01); *D06M 10/025* (2013.01); *H05H 1/2439* (2021.05);
(Continued)

(58) Field of Classification Search
CPC ............. H05H 1/2406; H05H 2245/34; H05H 1/2418; H05H 1/2439; H05H 1/2443;
(Continued)

(56) References Cited

U.S. PATENT DOCUMENTS 9,889,218 B2 * 2/2018 Morfill ...................... A61L 2/14
10,300,159 B2 5/2019 Morfill et al.
(Continued)

FOREIGN PATENT DOCUMENTS

CN 102409525 A 4/2012
CN 104981269 A 10/2015
(Continued)

OTHER PUBLICATIONS

English translation of WO-2018167159-A1 (Year: 2018).*

*Primary Examiner* — Chris Q Liu
(74) *Attorney, Agent, or Firm* — Laurence A. Greenberg; Werner H. Stemer; Ralph E. Locher

(57) ABSTRACT

A plasma device applies cold atmospheric plasma to a surface to be treated, in particular to textiles, leather and/or plastic fibers. An actuator activates a plasma source, provided that a distance between the plasma source and the surface to be treated is less than a predetermined distance. The actuator has an adjustable and pre-loaded actuator element with at least one activation element and has a recording apparatus that records the position of the actuator element at least when the distance between the plasma source and the surface to be treated is less than the predetermined distance. The plasma device makes it possible to avoid risks owing to incorrect operation by the client and to avoid emissions, since the plasma source is activated only when the distance from the item to be treated (e.g., clothing to be cleaned) is less than the predetermined threshold distance.

10 Claims, 7 Drawing Sheets

(52) U.S. Cl.
CPC ..... *H05H 2245/36* (2021.05); *H05H 2245/40* (2021.05); *H05H 2245/60* (2021.05)

(58) Field of Classification Search
CPC .. H05H 1/2431; H05H 1/2475; H05H 1/2481; H05H 2245/36; H05H 2245/40; H05H 1/28; H05H 1/3405; H05H 1/3423; H05H 1/3447; H05H 1/3478; H05H 1/473; H05H 2245/32
USPC ..................................................... 219/121.36
See application file for complete search history.

(56) References Cited

U.S. PATENT DOCUMENTS

| | | | |
|---|---|---|---|
| 10,904,995 B2 | 1/2021 | Nettesheim et al. | |
| 2011/0308457 A1 | 12/2011 | Simor et al. | |
| 2012/0039747 A1 | 2/2012 | Morfill et al. | |
| 2014/0147333 A1 | 5/2014 | Morfill et al. | |
| 2014/0207053 A1* | 7/2014 | Morfill | A61L 2/24 604/23 |
| 2016/0193475 A1 | 7/2016 | Srb et al. | |
| 2019/0083161 A1* | 3/2019 | Harle | H05H 1/2406 |

FOREIGN PATENT DOCUMENTS

| | | | | |
|---|---|---|---|---|
| EP | 3075896 A1 | 10/2016 | | |
| KR | 101407672 B1 | 6/2014 | | |
| WO | 2012150041 A1 | 11/2012 | | |
| WO | 2015059702 A1 | 4/2015 | | |
| WO | 2017162614 A1 | 9/2017 | | |
| WO | 2017179819 A1 | 10/2017 | | |
| WO | WO-2018167159 A1 * | 9/2018 | H05H 1/2475 | |

* cited by examiner

| type of fabric | moist fabric after CAP treatment | dry fabric after CAP treatment | result |
|---|---|---|---|
| artificial leather | 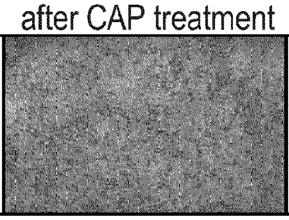 | 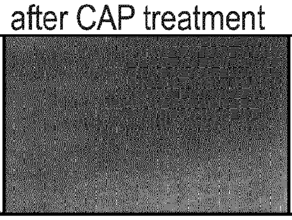 | • no change in color<br>• material not harmed |
| brocade | 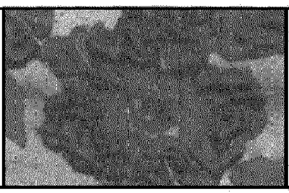 |  | • no change in color<br>• material not harmed |
| cotton (elastic) | 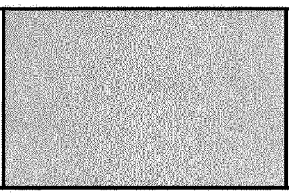 | 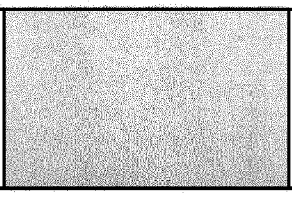 | • no change in color<br>• material not harmed |
| fleece | 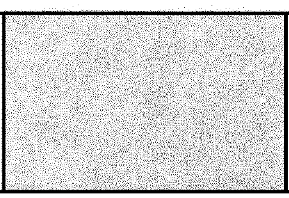 | 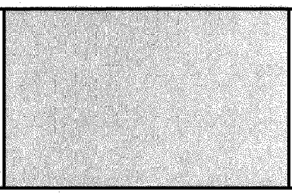 | • no change in color<br>• material not harmed |
| polyacrylic | 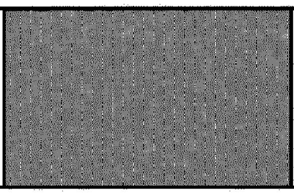 | 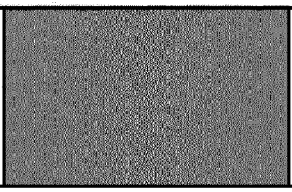 | • no change in color<br>• material not harmed |
| synthetic jersey w. velvet applications | 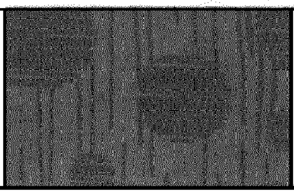 | 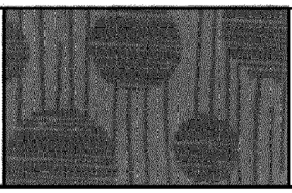 | • no change in color<br>• material not harmed |

Fig. 3A

| type of fabric | moist fabric after CAP treatment | dry fabric after CAP treatment | result |
|---|---|---|---|
| cotton (rigid) | 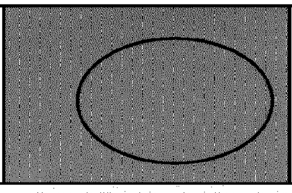 | 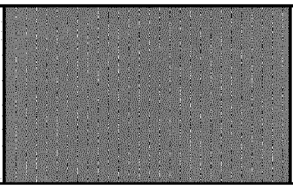 | • no change in color<br>• wet material shows burns |
| linen | 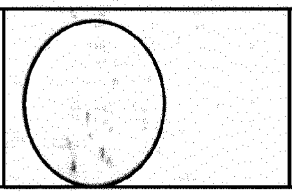 | 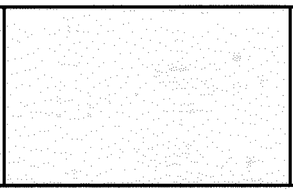 | • no change in color<br>• wet material shows significant burns |
| polyester | 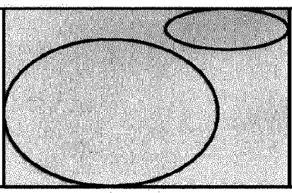 | 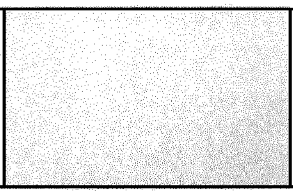 | • no change in color<br>• wet material shows burns |
| satin | 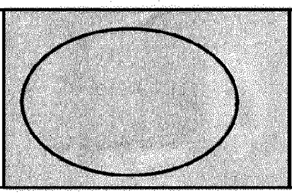 | 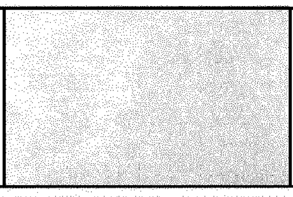 | • no change in color<br>• wet material shows burns |
| Silk (thinly woven) | 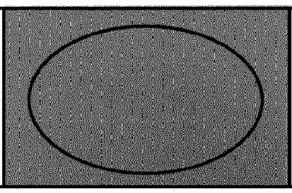 | 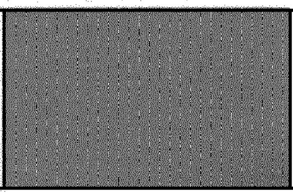 | • no change in color<br>• wet material shows burns |
| jersey w. weaving pattern (delicate) | 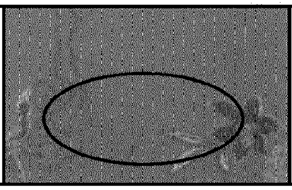 | 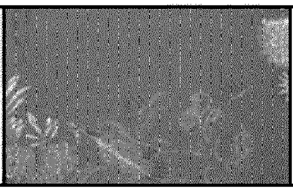 | • no change in color<br>• wet texture is harmed- some fibers are ripped out |
| velvet | 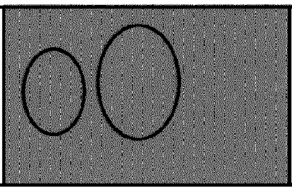 | 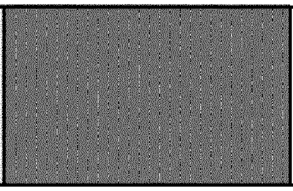 | • no change in color<br>• material is burned and slightly scratched |

Fig. 3B

PLASMA DEVICE

FIELD AND BACKGROUND OF THE INVENTION

The present invention relates to a plasma device, in particular for applying cold atmospheric plasma to a surface to be treated, in particular to textiles, leather and/or fibers.

It is known that plasmas can be used for disinfection, in particular of surfaces contaminated with bacteria. Typical applications of such plasma devices can be found in the fields of disinfection or sterilization, surface functionalization and in the medical field, such as wound disinfection, wound treatment, healing and treatment of skin irritations, as well as treatment of bacterial, viral and fungal skin diseases. The known plasma devices are now no longer restricted to application to surfaces. They can also be used to disinfect air.

Bacteria are often responsible for the formation of unpleasant odors on surfaces or in volumes of air, for the metabolization of foodstuffs present and then for the creation of substances with an unpleasant odor. The elimination or deactivation of these bacteria can at least temporarily prevent the formation of additional substances with unpleasant odors or other obtrusive molecules, i.e. molecules that are not relevant to odor, but which cause discomfort, malaise, illness, debility or similar states, such as allergens, protein molecules or prions. The substances already present are not however eliminated, so their odor can generally only be concealed by additional volatile substances, such as fragrances for example. Hence it is desirable to deactivate the strong-smelling substances.

A further area of use is to freshen textiles and/or clothing instead of or in addition to washing.

It is known that textiles and/or clothing can be freshened using various methods. One possibility is to cover the odor by a suitable, more pleasant odor or fragrance, although this does not remove the odor molecules or the source of the odor. A further possibility is to remove the source of the bad odor (for example bacteria). As a result however the odor molecules present are not removed, and only the creation of a new odor is stopped, provided that all bacteria are permanently inactivated. Since bacteria typically double in number in preferred zones, such as for example in an armpit area, in 5 minutes, a 3-log reduction to one thousandth (1/1000) is replenished again after just 1 hour, so that an antibacterial method such as this has to be frequently repeated. A further possibility is the destruction of bad-smelling molecules using chemical processes. Ozone can in particular be used for this, but because of its toxicity has to be filtered out of the air again after the chemical oxidation of bad-smelling molecules. In addition, the reaction is slow and requires long interaction times, since ozone molecules move thermally at only approximately 200 meters per second. It is also possible to remove bad-smelling molecules by washing the textiles and/or clothing. This is a standard process, part mechanical, part chemical. It normally works well, but it takes time, is expensive, has high $CO_2$ emissions and calls for access to a washing machine, which is not always possible (for example when traveling). Another problem with this is that not all textiles or items of clothing can be washed, since they are damaged or even destroyed during the washing process. In addition, washing below 40° C. does not remove sources of odor (for example bacteria) and can even promote their growth. Likewise the bad odor can also be removed by dry cleaning. The same principle applies fundamentally as for washing, while dry cleaning agents can damage some textiles and/or clothing.

In addition to the aforementioned method, cold atmospheric plasma devices can also be used to eliminate a bad odor. Plasma devices can conventionally only be operated efficiently at relatively high voltage amplitudes, and for reasons of electrical safety there are restrictions on the operation of such devices close to a person's skin. In addition, conventional devices are comparatively large and rigid.

In addition, plasma devices can generate a series of chemical bonds. Examples of these may include electrons, ions, reactive bonds, in particular reactive oxygen such as $O_3$ and nitrogen species such as NO, $NO_2$, etc., neutral systems and UV light, some of which can cause damage to human beings if certain threshold values are exceeded. The local increase in temperature at the interface of a plasma device and a surface to be treated can in addition damage the material to be treated.

The application of cold plasma to freshen the clothing must accordingly be both convenient and safe. Both the treated fabric and the user should be protected against unpredictable problems, including misuse, and problem-free operation should furthermore be enabled.

SUMMARY OF THE INVENTION

The present invention is hence concerned with the problem of specifying an improved or at least an alternative form of embodiment for a plasma device, which in particular overcomes the disadvantages known from the prior art.

The present invention is based on the general concept of fitting a plasma device for applying a cold atmospheric plasma to a surface to be treated, in particular to textiles, leather and/or plastic fibers, with a technically simple and reliable actuator which permits activation of a plasma source only under predetermined basic conditions. The inventive plasma device has a housing along with a plasma source arranged therein and a voltage source for applying a voltage to the plasma source, as well as the actuator, which is designed to activate the plasma source provided that a distance between the plasma source and the surface to be treated lies within a predetermined distance, wherein the actuator has an adjustable and preloaded actuator element having at least one activation element and has a recording facility that records the position of the actuator element at least provided that the distance between the plasma source and the surface to be treated lies within the predetermined distance. The plasma device is thus configured to permit the activation of the plasma source (for example activation by a user, for example via an input by the user) only if a distance between the plasma source and the surface to be treated lies within the predefined distance. This means that the plasma can be ignited only if the plasma device is located close to the surface to be treated or comes into contact with it.

The inventive plasma device makes it possible in particular to avoid risks owing to incorrect operation by the client, since the plasma source is activated only when the distance from the item of clothing to be cleaned lies within the predetermined distance. Another advantage of the invention is its very compact and inexpensive construction. This is also deemed to be helpful in preventing emissions if the plasma device is not used as intended.

In the following description the actuator should also be understood as any construction that is suitable for enabling the activation of the plasma source only when a distance between the plasma source and the surface to be treated lies within the predefined distance. A distance sensor or a light barrier can for example be subsumed under the term "recording facility". The recording facility records the distance and can activate the plasma source directly or indirectly when a distance between the plasma source and the surface to be treated lies within the predefined distance.

In an advantageous development of the invention a spring, an elastic plastic element, such as a sealing lip, a foam element or a rubber element, or a pneumatic or hydraulic resetting facility is provided for preloading and resetting the actuator element. Even this non-exhaustive list provides a wide selection of reliably working and simultaneously inexpensive resetting facilities which again and again reset the actuator element to its initial position and thereby deactivate the plasma source.

The recording facility expediently has a proximity sensor, a contact sensor, a microswitch, a strain gauge, a magnetic sensor and/or a light barrier. The actuator element is provided in the direction of the device with one or more activation elements, to indicate to an electronics system, in this case the recording facility, that the plasma device is in secure contact with the surface to be treated. These activation elements can then be interrogated with any proximity or contact sensors, for example activate microswitches or operate other sensors provided with metal parts/magnets. Strain gauges attached to a deformable material are also conceivable. As a result, the recording facility can be manufactured inexpensively and extremely flexibly.

In a further development of the invention the recording facility has a light barrier and the activation element has a chamfered flank, wherein the recording facility is designed such that it determines a degree of coverage of the light barrier and thus a distance between the plasma source and the surface to be treated. As a result it is possible, by means of the recording facility having the light barrier, to display not only an "ON" or "OFF" position, but also intermediate settings that depend on the distance between the plasma source and the surface to be treated.

The recording facility expediently has a light barrier and is arranged on a circuit board having an opening, wherein the opening is crossed or covered by the light barrier and into which the activation element engages, provided that the distance between the plasma source and the surface to be treated lies within the predetermined distance. In this exemplary embodiment the activation element of the actuator element thus engages through the opening, as a result of which a very space-saving construction can be achieved.

The predefined distance preferably lies in a range between 0 and 4 mm, preferably between 0 and 1 mm. The particular advantage of this is that depending on a predefined parameter (for example distance) the plasma source or an individual plasma source segment can be activated and/or deactivated. In this case it is assumed that this permits a further reduction in emissions and an increase in the overall efficiency of the plasma device.

The plasma device can expediently preferably contain a display light or control light which is configured to instruct a user to ventilate a region around the plasma device, after the plasma source has been switched on for a predetermined period of time. As a result, reliable long-term operation can be ensured.

In an advantageous development of the invention a speed sensor is provided to measure a speed with which the plasma device is moved over the surface to be treated, wherein the plasma device is preferably configured such that it automatically switches off the plasma source when the recorded speed is less than a first predetermined value or more than a second predetermined value. In this way it is ensured that the plasma device is working in an appropriate speed range, i.e. not too slow (in order to keep the temperature at the contact point between the plasma device and the surface to be treated below the operating threshold, i.e. below the temperature that can damage the material to be treated) and not too fast (in order to fulfill the purpose of the treatment, for example in order to enable the deactivation of the bad-smelling molecules).

A surface property recording apparatus, in particular a temperature sensor or a moisture sensor, is expediently provided to record at least one property of the surface to be treated. The at least one property can for example be a moisture content or a temperature. This means that the surface property recording apparatus preferably contains a moisture sensor for recording the moisture level of the surface to be treated, wherein the plasma device is preferably designed such that the plasma source is automatically switched off when the moisture content of the surface to be treated is greater than a predefined moisture value, as a result of which the plasma device is prevented from being operated with too high a power. The moisture content of the surface to be treated can be determined by measuring the power draw of the plasma source. The power consumed by the plasma source is preferably plotted with a frequency of at least 10 $s^{-1}$, preferably 50 $s^{-1}$ and preferably 100 $s^{-1}$. This measurement can be performed for example in the control circuit of the plasma device. Thus the plasma source and the control circuit can form the moisture sensor. However, a separate sensor can also be used. Alternatively or additionally the surface property recording apparatus contains a temperature sensor to record the temperature of the surface to be treated, wherein the plasma device is configured to switch off the plasma source automatically when the temperature of the surface to be treated is greater than a predefined temperature value, as a result of which damage to the material to be treated is prevented.

The plasma device is expediently portable and the voltage source has a battery or a rechargeable battery. As a result, comparatively simple mobile use is possible. In addition, the plasma source can be interchangeable. Thus for example the plasma device can be constructed such that the plasma source is accommodated in a plasma source unit of the plasma device and the voltage source is accommodated in a main housing of the plasma device and the plasma source unit is removably coupled to the main housing. In this way a plasma device can for example contain the main housing and a series of plasma source units, each of which is suitable for a particular material to be treated.

As described herein, the term "cold atmospheric plasma" (CAP) refers to plasmas which work under normal atmospheric conditions (for example temperature and pressure) and for example enable pain-free in-vivo applications without tissue damage. Cold atmospheric plasmas can be created for example by restricting a number of high-energy electrons and/or by cooling uncharged molecules/atoms in the plasma. An important feature of cold atmospheric plasma is that it still has antibacterial and fungicidal properties.

As further described herein, the plasma source can be designed in any form that enables the cold atmospheric plasma to be created and to be applied to a surface to be treated. An SMD device (Surface Micro Discharge) is preferably used. Further optional structural features are explained below.

The plasma device is preferably further configured in order to enable the plasma source to be activated (for example activation by a user, for example via an input by the user) again after the plasma source has been switched off for a predetermined waiting period, as a result of which the concentration of the toxic substances drops significantly below the threshold value.

The plasma device preferably contains a control circuit which is configured to adjust the plasma as a function of the recorded surface quality, in particular as a function of the recorded moisture and/or temperature, such that the freshening treatment is performed without damaging the material to be treated.

The plasma source preferably contains a first electrode, a second electrode and a dielectric layer that isolates the first electrode and the second electrode, wherein the first electrode is configured to ignite the cold atmospheric plasma for the treatment of the surface to be treated. This means that the first electrode is arranged such that it lies closer to the surface to be treated than the second electrode. The first electrode is preferably configured such that it touches the surface to be treated. The first electrode can further be covered with a dielectric material. The first electrode or the dielectric material that covers the first electrode is preferably exposed to the ambient atmosphere through an opening in the housing, while the second electrode is arranged inside the housing. It is pointed out that an electrode structure such as this also represents an independent aspect of the present invention and can be provided independently of the aforementioned first aspect. However, it can also be combined with each of the aforementioned sensors.

To further increase the safety of the plasma device, in particular against misuse, the first electrode is grounded and/or the plasma device further contains an on/off switch that is electrically connected to the first electrode, wherein the plasma device is configured to enable only the activation of the plasma source and/or to switch on the plasma source selectively only when the on/off switch is pressed. Accordingly, when the plasma device is used, there is no difference in potential between the user and the first electrode, and thus no discharge to the user from the first electrode, i.e. the electrode at which the plasma is ignited.

In other words, a conductive connection between the first electrode and the skin of the user can be produced, for example by a conductive switch and/or by another conductive part of the housing of the device. The device is preferably designed such that the conductive switch and/or the conductive housing section has to be held and/or pressed by the user, so that the plasma device works (for example continuously held and/or pressed during the operation of the plasma device). In other words, when the conductive switch and/or the conductive housing section is not pressed and/or held by the user, the device's control circuit can deactivate an activation of the plasma source. The switch can be the on/off switch of the device. However, an additional safety switch can also be used, which has to be pressed in addition to the on/off switch.

This switch (for example the on/off switch) can be embodied as a mechanical switch, but also as any other type of touch sensor (for example a resistive or capacitive touch sensor).

Also, for example in cases in which the first electrode is the electrode that comes into contact with the surface to be treated, the plasma device can further contain a temperature sensor that is configured to record a temperature of the first electrode. The plasma device is preferably configured to switch off the plasma source selectively automatically when the temperature of the first electrode is greater than a predefined temperature value. As a result, the risk of damage by an overheated electrode to the material and/or fabric to be treated is reduced.

In order to treat larger regions, the plasma device preferably contains segmented plasma sources, wherein each segment can be provided with one of the aforementioned safety architectures, for example the distance sensor, the light sensor, the speed sensor, the display or the control light, the surface property recording apparatus, etc.

The plasma source preferably contains at least one first plasma source segment and at least one second plasma source segment, wherein the plasma device is configured to switch on the first plasma source segment selectively only when a distance between the first plasma source segment and the surface to be treated lies within the predetermined distance, and to switch on the second plasma source segment selectively only when a distance between the second plasma source segment and the surface to be treated lies within the predetermined distance. The predefined distance preferably lies in a range between 0 and 4 mm and preferably between 0 and 1 mm. The particular advantage of this is that depending on a predefined parameter (for example distance) an individual plasma source segment can be activated and/or deactivated.

At least one of the first electrode or the second electrode preferably contains a first electrode segment in a region of the first plasma source segment and a second electrode segment in a region of the second plasma source segment. This means that at least one of the electrodes can be a segmented electrode. The other electrode is preferably a shared electrode that is assigned to the first and second electrode segment. However, a segmented second electrode can also be used.

The first plasma source segment and the second plasma source segment are preferably electrically connected in parallel.

The invention is described in greater detail below using the preferred forms of embodiment shown in the drawings. The scope of the invention for which protection is desired should not however be restricted to the details shown or described below, but should be defined by the appended claims. In the drawings,

BRIEF DESCRIPTION OF THE FIGURES

FIG. 3A shows different wet/damp textiles, which did not show any damage during the cold atmospheric plasma treatment, wherein dry fabrics after the same treatment are also shown for comparison;

FIG. 3B shows different wet/damp textiles, which showed particular damage during the cold atmospheric plasma treatment, wherein dry fabrics after the same treatment have also been shown for comparison;

DETAILED DESCRIPTION OF THE INVENTION

Figure 1:
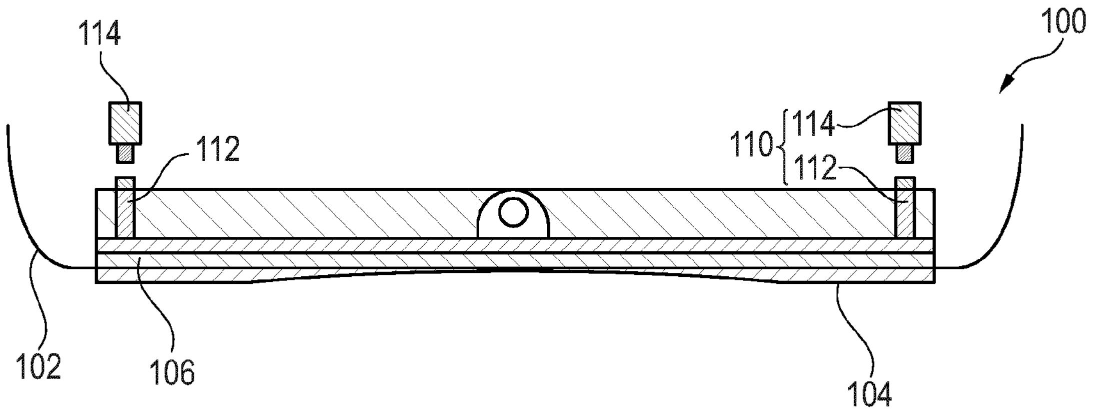
FIG. 1 shows a schematic representation of a plasma device in accordance with a preferred form of embodiment of the present invention.

With reference to FIG. 1 a plasma device 100 for applying a cold atmospheric plasma to a surface to be treated (not shown) in accordance with a preferred form of embodiment of the present invention contains a housing 102, a plasma source 104 in the housing 102 and a voltage source (not shown) in the housing 102 for applying a voltage to the plasma source 104. The plasma source 104 can be held by a plasma source holder 106, which forms a front part of the housing 102, as shown in FIG. 1. The plasma device 100 is configured to enable the activation of the plasma source 104 only when a distance between the plasma source 104 and the surface to be treated lies within a predetermined distance. The selective switch-on can be realized for example by a distance sensor 110, as shown in FIG. 1 or by an actuator 900 according to FIG. 9.

In particular the actuator embodied as a distance sensor 110 is a mechanical distance sensor with a voltage source connector 114 which is electrically connected to the voltage source, and a plasma source connector 112 which is electrically connected to the plasma source 104. The voltage source connector 114 and the plasma source connector 112 are configured such that they are spaced apart from one another when the plasma device 100 is not in contact with the surface to be treated. In the meantime the voltage source connector 114 and the plasma source connector 112 are configured such that they can move in respect of one another. Accordingly, when the plasma device 100 is brought into contact with the surface to be treated, the housing 102 (the plasma source holder 106) and/or the plasma source 104 is pressed against the surface to be treated, in that the plasma source connector 112 is pressed inward to the voltage source connector 114 and finally the voltage source connector 114 is electrically coupled to the plasma source connector 112, as a result of which the voltage source can apply a voltage, i.e. can selectively switch on the plasma source 104.

In this case the connectors 112, 114 need not necessarily be connected to the plasma source or the voltage source. Thus they can for example also be coupled to a controller (not shown) that indicates whether a connection exists.

Figure 2:
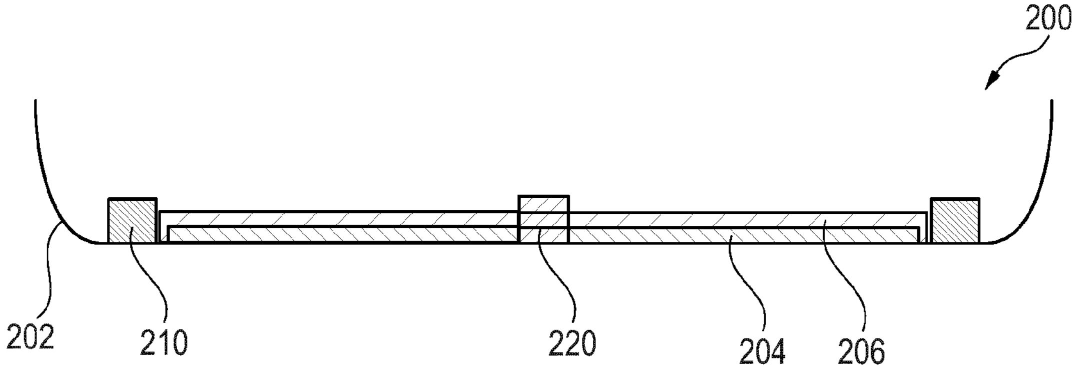
FIG. 2 shows a schematic representation of a plasma device in accordance with a preferred form of embodiment of the present invention.

The switching mechanism can of course be realized in a different way. With reference to FIG. 2 a plasma device 200 in accordance with another preferred form of embodiment of the present invention for example contains a housing 202, a plasma source 204, a plasma source holder 206 and a voltage source (see below), which are similar to the corresponding elements in the form of embodiment shown in FIG. 1. However, instead of the distance sensor 110 the plasma device 200 contains a light sensor 210, in particular as an actuator or as a recording facility. When the plasma device 200 is brought close to an object to be treated, the light is gradually blocked by this object and the quantity of light received by the light sensor 210 is reduced. The plasma device 200 is configured to switch off the plasma source 204 selectively when the quantity of light received by the light sensor 210 is less than a predefined value, or to enable the switch-on (for example by the user) only in this case. The predefined value can here be determined by the quantity of light received by the light sensor 210 when the plasma device 200 is held at the predefined distance (for example 4 mm, 3 mm, 2 mm or 1 mm) from the surface to be treated.

It should be noted that the position of the light sensor 210 is not particularly restricted. While the light sensor 210 in FIG. 2 is arranged at both ends of the plasma source 204, additional or alternative light sensors can be arranged for example in the center of the plasma source 204, as the light sensor 220 shows.

In order to examine further aspects of the safe user of the plasma device on textiles/items of clothing to be freshened, in particular in respect of safety for the materials to be handled, the inventors carried out a series of cold atmospheric plasma treatments on different fabrics in their wet and dry states, the results of which are summarized in FIGS. 3A and 3B.

It can be seen from FIGS. 3A and 3B that the treatment with the plasma device was applicable for all fabrics tested—dry or damp. The plasma device could be gently moved over all fabrics to be examined—no sticking or catching was observed. For all dry materials examined in the context of this study, no changes in color or other damage were observed. This is the result regardless of the number of test washes. However, during the treatment of wet/damp fabrics, some fabric tests showed damage, as marked in FIG. 3B in the respective sections of the photographs.

In this case it is deduced from visual examinations that burning of damp fabrics occurs at slightly dry points in the fabric where the plasma discharge is concentrated and the local temperature is increased.

Figure 4A:
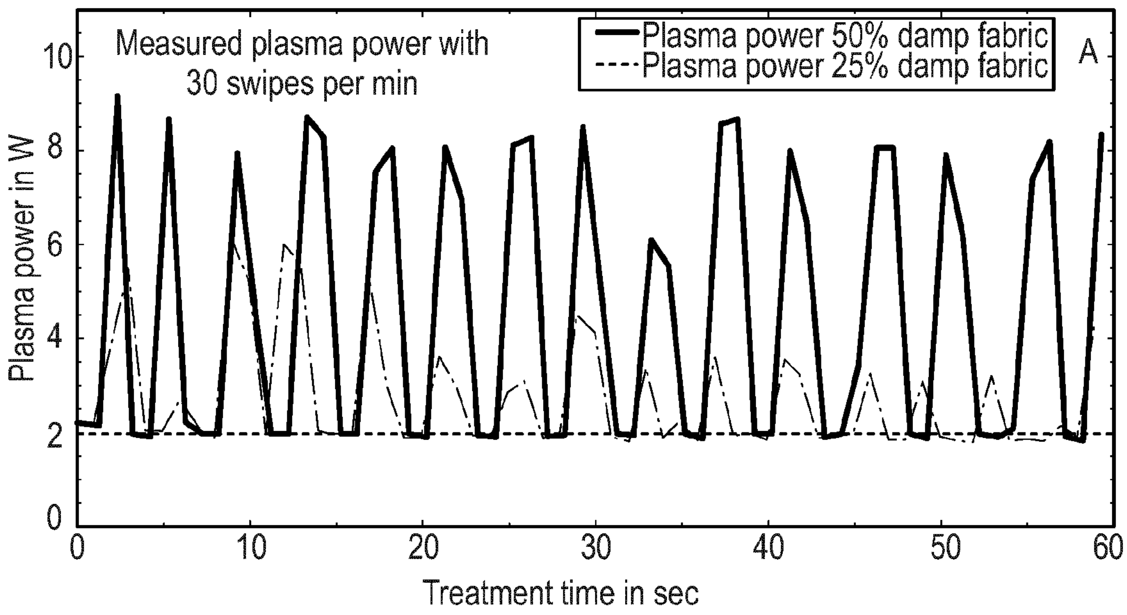
FIGS. 4A and 4B show the plasma power that is consumed by a plasma source of a plasma device in accordance with the present invention, when the plasma device has been swiped over sample fabrics with the conditions described in full below.
Figure 4B:
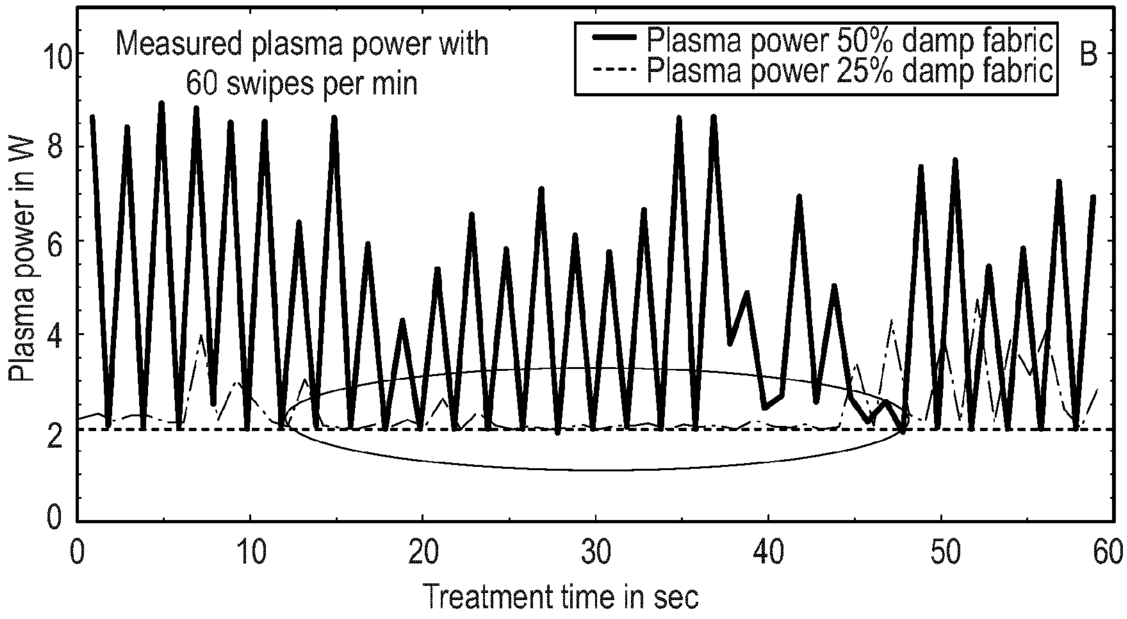

FIGS. 4A and 4B show measurements of the plasma power that is consumed by a plasma source of a plasma device, which applies cold atmospheric plasma to cotton fabric with different moisture states. In particular, the test designated as "50% damp fabric" is a cotton fabric consisting in equal parts of a wet region and a dry region, in which the plasma device is pushed back and forth between the wet region and the dry region. The test designated as "25% damp fabric" has a similar configuration with a reduced (i.e. half) quantity of liquid that is applied to the wet region. FIG. 4A shows swiping at 30 swipes per minute, whereas FIG. 4B shows swiping at 60 swipes per minute. The results show significant differences in the plasma power as a function of the dampness of the fabric, as explained in greater detail below.

The transfer from the dry region of the fabric to the 50% or 25% wet region of the fabric can clearly be seen. For the dry region of the fabric a plasma power consumption of approx. 2 watts is determined for all tests examined in the context of this study. This value increases to 3 to 9 watts when the plasma source is moved into the damp region of the fabric (50% and 25%). Based on these results it is assumed that the damage to the wet fabric shown in FIG. 3B is due to an increased local temperature of the plasma source working with an increased power. Without being tied to the theory, it is assumed that the wet surface increases the resistance to the ignition of the plasma. It is assumed that the plasma thus ignites only locally at dry/dry points and/or dry/dry pores of the surface to be treated, where the resulting power concentration is then high and can thus lead to small local burns.

The results also show that the measured power consumptions for the 25% damp fabric section are less than the power consumptions for the 50% damp section. Nevertheless, all measured power consumptions for 50% and 25% damp fabric are appreciably higher than the measured power for the dry region of the fabric.

In contrast to FIG. 4A, which shows large differences in the power consumption for dry and wet fabrics, FIG. 4B shows that for the 25% damp fabric and with a high swipe rate (60 swipes per minute) it was difficult to record this difference. This means that it is crucial to record the power consumption of the plasma fast enough in order to identify the damp region with the plasma power measurement method. One example of plotting that is too slow is marked in FIG. 4B with an ellipse for the 25% damp fabric. It is hence assumed that the power draw of the plasma source should be plotted with a frequency of at least 10 s−1, preferably 50 s−1 and preferably 100 s−1.

Since the power consumed by the plasma source is influenced by the air moisture of the fabric to be treated, it is considered in view of the results shown in FIGS. 4A and 4B that a plasma device, which is further able to measure the power consumption of the plasma source (for example by additional inclusion of a plasma power consumption measurement system which can be realized by any known electrical circuit—a "power monitor"), can itself act as a moisture sensor. With the plasma power draw measurement system the plasma device can also perform an automatic switch-off when the power exceeds a particular threshold value. When the power exceeds a particular threshold value and/or when a pattern is identified in the power measurements which shows that the surface to be treated exceeds a particular degree of dampness, the device can be automatically switched off and/or the power output to the plasma source can be automatically limited.

Measurements such as these can be used to define the parameters that are required for the control of cold atmospheric plasma devices for freshening clothing, to define operating conditions, to identify dry and damp parts of clothing and adjust the plasma power accordingly, to provide different plasma settings for different fabrics and to control the plasma power as a function of the speed with which the freshener is moved over the fabric. Stated briefly, in principle a virtually autonomous control system can be set up in order to ensure safe operation of the cold atmospheric plasma device under particular operating conditions. This helps to ensure safe treatment of different fabrics under different conditions.

Figure 5:
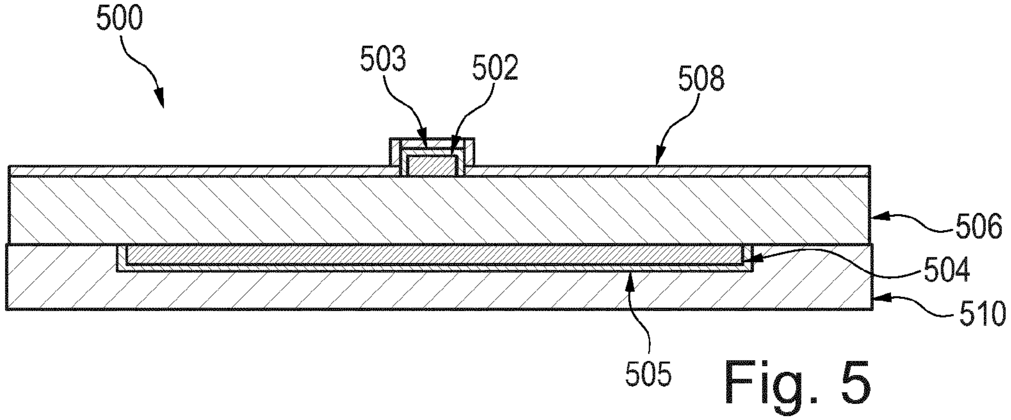
FIG. 5 is a schematic cross-sectional view which shows the structure of a plasma source of a plasma device in accordance with a preferred form of embodiment of the present invention.

FIG. 5 shows an exemplary structure of a plasma source of a plasma device in accordance with a preferred form of embodiment of the present invention.

The plasma source 500 contains a first electrode 502, a second electrode 504 and a dielectric layer 506 that isolates the first electrode 502 and the second electrode 504. The first electrode 502 is configured to ignite the cold atmospheric plasma for the treatment of the surface to be treated. This means that the first electrode 502 is arranged such that it is closer to the surface to be treated than the second electrode. In FIG. 5 the first electrode 502 is further covered with a dielectric material 508 that preferably consists of a plasma-resistant insulation material, for example a glass-fiber-reinforced hydrocarbon ceramic.

Viewed in the direction of the stack the second electrode 504 preferably has a thickness of at least 10 μm, wherein the first electrode 502, likewise viewed in the direction of the stack, preferably has a thickness of at least 10 to at most 50 μm. Viewed in the direction of the stack the dielectric layer 506 preferably has a thickness of at least 100 μm to a maximum of 300 μm. The dielectric material 508 preferably has a thickness of at least 0.1 μm in the direction of the stack. The dielectric material 508 preferably has a thickness of at most 30 μm in the direction of the stack, preferably at most 10 μm. Thus the thickness can be between 0.1 μm and 30 μm or between 0.1 μm and 10 μm in the direction of the stack.

The first electrode 502 and/or the second electrode 504 preferably each contain a coating 503 and a coating 505, which comprises one of the following materials: Electroless Nickel Immersion Gold (ENIG), Electroless Nickel Electroless Palladium Immersion Gold (ENEPIG), Electroless Nickel Immersion Palladium Immersion Gold (ENIPIG), Electroless Palladium (EP) and Electroless Palladium Immersion Gold (EPIG), hard gold. The coating 503 and/or the coating 505 can have a thickness of at least 0.5 μm, preferably at least 0.8 μm. The coating 503 and/or the coating 505 can have a thickness of 1.5 μm or less, preferably 1.25 μm or less. Thus the coating 503 and/or the coating 505 can have a thickness of 0.5 μm to 1.5 μm, preferably 0.8 μm to 1.25 μm, in particular when it is produced from hard gold or another of the aforementioned materials.

The aforementioned stack structure is preferably constructed on a base element 510, on which the dielectric layer 506 can also be arranged and/or in which the second electrode 504 can be accommodated.

As explained above, a plasma device in accordance with the present invention can contain segmented plasma sources, for which the basic structure shown in FIG. 5 can still be retained.

Figure 6A:
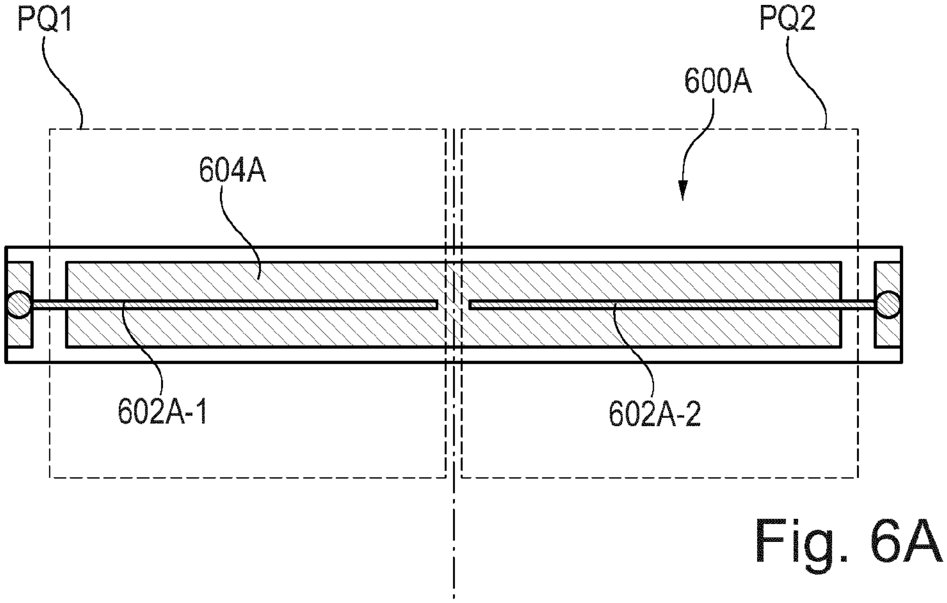
FIGS. 6A and 6B each show schematic plan views of two examples of a plasma source with two plasma source segments.

With reference to FIG. 6A the plasma source 600A contains a first plasma source segment PQ1 and a second plasma source segment PQ2. The plasma device 600A is configured to switch on the first plasma source segment PQ1 selectively only when a distance between the first plasma source segment and the surface to be treated lies within the predefined distance, and to switch on the second plasma source segment PQ2 selectively only when a distance between the second plasma source segment and the surface to be treated lies within the predefined distance. The selective switch-on of each of the plasma source segments PQ1, PQ2 can be realized as described above by a distance sensor and/or a light sensor and/or an actuator 900 in accordance with FIG. 9. In addition, each of the plasma source segments PQ1, PQ2 can be fitted independently of one another with the abovementioned safety measures such as the speed sensor, the surface property recording apparatus, etc.

Similarly to the structure of the plasma source 500 shown in FIG. 5, the plasma source 600A also contains a first electrode 602A, a second electrode 604A and a dielectric layer that isolates the first electrode 602A and the second electrode 604A, but which is not shown in order better to illustrate the arrangement of the electrodes. The plasma source segments PQ1, PQ2 are formed, since the first electrode 602A contains a first electrode segment 602A-1 in the region of the first plasma source segment PQ1 and a second electrode segment 602A-2 in the region of the second plasma source segment PQ1. The second electrode 604A can meanwhile be a shared electrode which is assigned to the first and second electrode segment 602A-1, 602A-2.

Figure 7A:
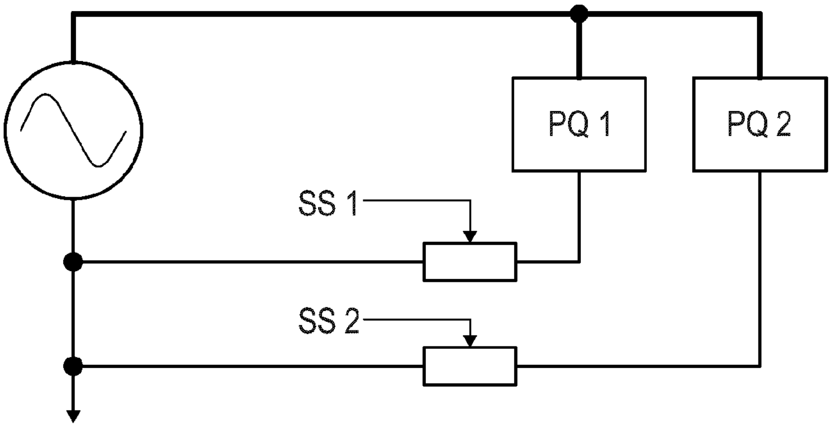
FIGS. 7A and 7B show exemplary circuit diagrams of the plasma sources represented in FIGS. 6A and 6B.

As can be seen in FIG. 7A, which represents a corresponding circuit diagram of the plasma source 600A, the plasma source segments PQ1 and PQ2 are connected electrically in parallel and can be activated or deactivated independently of one another.

Figure 6B:
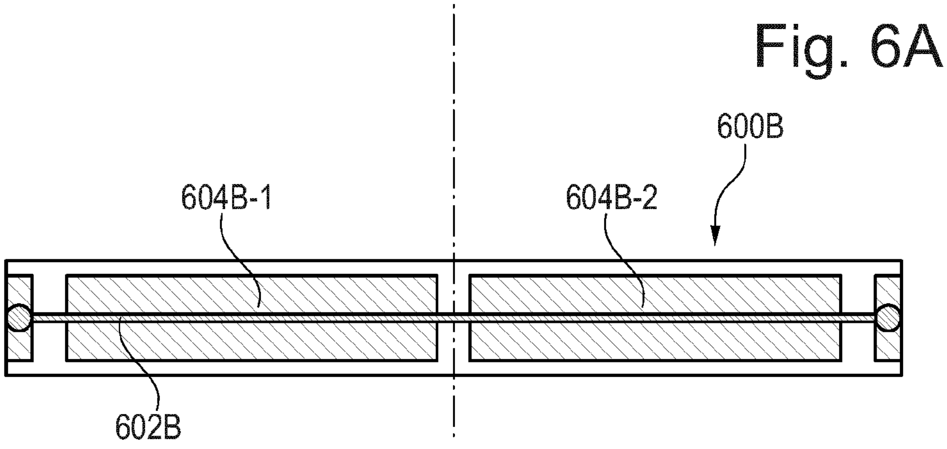
Figure 7B:
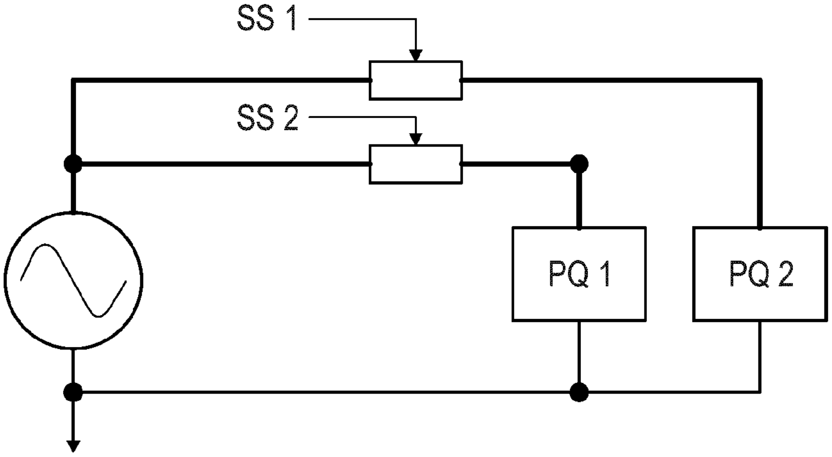

FIGS. 6B and FIG. 7B show a schematic diagram of a plasma source 600B and the corresponding circuit diagram thereof. Similarly to the plasma source 600A in FIG. 6A the plasma source 600B contains a first electrode 602B, a second electrode 604B and a dielectric layer (not shown) that isolates the first electrode 602B and the second electrode 604B. In FIG. 6B the second electrode 604B contains a first electrode segment 604B-1 and a second electrode segment 604B-2. Accordingly the plasma source 600B also consists of the plasma source segments PQ1 and PQ2, which are connected electrically in parallel and can be activated and deactivated independently of one another, as shown in FIG. 7B. As already mentioned, a plasma device with a segmented plasma source is deemed to be especially suitable for the treatment of larger areas.

Figure 8:
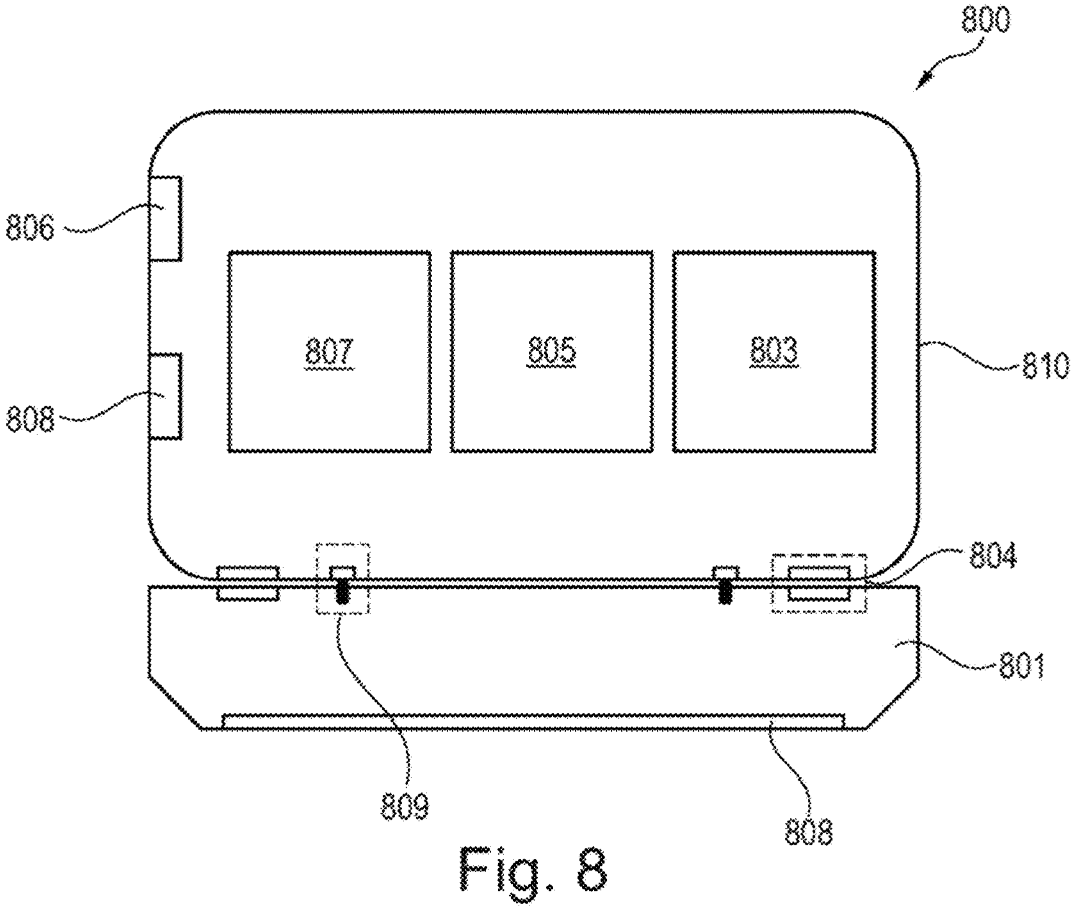
FIG. 8 shows a schematic diagram of a plasma device in accordance with a preferred form of embodiment of the present invention, which contains an interchangeable plasma source unit.

FIG. 8 shows a schematic diagram of a plasma device with an interchangeable plasma source unit.

With reference to FIG. 8 the plasma device 800 contains a plasma source unit 801, which is removably coupled to a main housing 810. The plasma source unit 801 contains the plasma source 802 among other things, the main housing 810 contains a battery module 803, which serves as a voltage source. The main housing 810 further contains the charging electronics 807 for charging the battery module 803 and a control module 805 which is responsible for the coordination of the respective functionalities of the plasma device 800. The main housing 810 is further fitted with a main switch 806 and a power supply interface 808.

The coupling between the plasma source unit 801 and the main housing 810 can be realized for example by mechanical coupling means 804 and an electrical connection 809, which structurally and electrically connect the plasma source unit 801 and the main housing 810. The coupling means 804 can be a pair of magnets. Other coupling methods, such as for example mechanical coupling means (for example a snap-in mounting or screws) are of course possible. The electrical connector 809 can be embodied for example in the form of a power outlet, as shown in FIG. 8, or another suitable structure. In this way the plasma source unit 801 can be replaced by another plasma source unit, which for example can have a different shape/electrode structure on the side facing the material to be treated. The window of application for the plasma device 800 is thereby extended.

The main housing 810 is preferably configured such that no electrical energy is generated at the contacts of the electrical connection 809 provided on the main housing 810, when the plasma source unit 801 is isolated via the mechanical coupling means 804 and/or is not correctly coupled. For this purpose the main housing 810 and the plasma source unit 801 are configured such that the electrical circuit that provides the contacts of the main housing 810 with voltage is not closed when the plasma source unit 801 is isolated. Alternatively or additionally a sensor can be provided on the main housing 810, to check whether an adequate coupling is present. Thus for example a mechanical sensor can be provided, such that the sensor is pressed only when the plasma source unit 801 is adequately coupled to the main housing 810. The sensor can be electrically connected to the control module 805.

Figure 9:
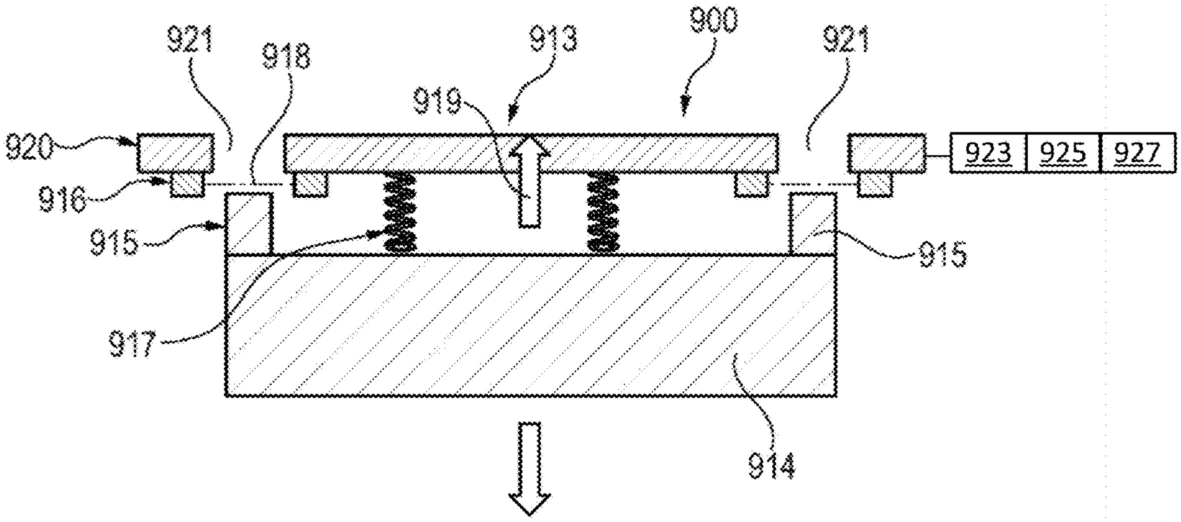
FIG. 9 shows a sectional view through an inventive plasma device in the region of an actuator.

In accordance with FIG. 9 the inventive plasma device 900 shown therein for applying a cold atmospheric plasma to a surface to be treated, in particular to textiles, leather and/or plastic fibers, has an actuator 913 which is designed for the activation of a plasma source 104 not further indicated in FIG. 9 but for example shown in FIG. 1, provided that a distance between the plasma source and the surface to be treated lies within a predetermined distance, wherein the actuator 913 has an adjustable and preloaded actuator element 914 with at least one activation element 915 and a recording facility 916 that records the position of the actuator element 914 at least provided that the distance between the plasma source and the surface to be treated lies within the predetermined distance. This also means that in this case the distance between the actuator element 914 and the actuator 913 lies within a predefined distance. The actuator element 914 is in this case adjustable in the direction of the actuator 913, provided that for example the plasma device 900 is placed on a surface to be treated. With the inventive plasma device 900 risks owing to incorrect operation by the client can thus in particular be avoided, since the plasma source is activated only when the distance from the item of clothing to be cleaned lies within the predetermined distance. The predefined distance is in this case in a range between 0 and 4 mm, preferably between 0 and 1 mm. The particular advantage of this is that depending on a predefined parameter (for example distance) the plasma source or an individual plasma source segment can be activated and/or deactivated. As a result a further reduction in emissions and an increase in the overall efficiency of the plasma device 900 are enabled.

In an advantageous development of the invention a spring 917, an elastic plastic element, such as a sealing lip, a foam element or a rubber element, or a pneumatic or hydraulic resetting facility is provided for preloading and resetting the actuator element 914. This represents a wide selection of reliably working and simultaneously inexpensive resetting devices which repeatedly reset the actuator element 914 to its initial position and thereby deactivate the plasma source.

The recording facility 916 expediently has a proximity sensor, a contact sensor, a microswitch, a strain gauge, a magnetic sensor and/or a light barrier 918. The actuator element 914 is provided in the direction of the device 919 with one or more activation elements 915, to indicate to an electronics system, in this case the recording facility 916, that the plasma device 900 is in secure contact with the surface to be treated. These activation elements 915 can then be interrogated with any proximity or contact sensors, for example activate microswitches or operate other sensors provided with metal parts/magnets. Strain gauges attached to a deformable material are also conceivable. As a result, the recording facility 916 can be manufactured inexpensively and extremely flexibly.

The recording facility 916 advantageously has the aforementioned light barrier 918 and the activation element 915 has a chamfered flank, wherein the recording facility 916 is designed such that it determines a degree of coverage of the light barrier 918 and thus a distance between the plasma source and the surface to be treated. As a result it is possible, by means of the recording facility 916 having the light barrier 918, to display not only an "ON" or "OFF" position, but also intermediate settings that depend on the distance between the plasma source and the surface to be treated.

In accordance with FIG. 9 the recording facility 916 has a light barrier 918 and is arranged on a circuit board 920, wherein the circuit board 920 has an opening 921 which is crossed or covered by the light barrier 918 and into which the activation element 915 engages, provided that the distance between the plasma source and the surface to be treated lies within the predetermined distance. In this exemplary embodiment the activation element 915 thus engages through the opening 921, as a result of which a very space-saving construction can be achieved.

The plasma device 900 can additionally have a display light or control light 923, which instructs the user to ventilate a region around the plasma device 900, after the plasma source has been switched on for a predetermined period of time. The plasma device 900 can also have a speed sensor 925 for measuring a speed with which the plasma device 900 is moved over the surface to be treated, wherein the plasma device 900 switches off the plasma source preferably automatically when the recorded speed is less than a first predetermined value or more than a second predetermined value. As a result it can be ensured that the plasma device 900 is working in an optimum speed range, i.e. not too slow (in order to keep the temperature at the interface between the plasma device 900 and the surface to be treated below the operating threshold, i.e. below the temperature that can damage the material to be treated) and not too fast (in order to fulfill the purpose of the treatment, for example in order to enable the deactivation of the bad-smelling molecules).

A surface property recording apparatus 927 is expediently provided, in particular a temperature sensor or a moisture sensor, for recording at least one property of the surface to be treated. The at least one property can for example be a moisture content, a temperature, etc. This means that the surface property recording apparatus 927 preferably contains a moisture sensor for recording the moisture level of the surface to be treated, wherein the plasma device 900 preferably automatically switches off the plasma source when the moisture content of the surface to be treated is greater than a predefined moisture value, as a result of which the plasma device 900 is prevented from being operated with too high a power. The moisture content of the surface to be treated can be determined by measuring the power draw of the plasma source. Alternatively or additionally the surface property recording apparatus 927 contains a temperature sensor to record the temperature of the surface to be treated, wherein the plasma device 900 is configured to switch off the plasma source preferably automatically when the temperature of the surface to be treated is greater than a predefined temperature value, as a result of which damage to the material to be treated is prevented.

In addition, the plasma device 900 is preferably portable and the voltage source has a battery or a rechargeable battery. As a result, comparatively simple mobile use is possible. In addition, the plasma source can be interchangeable. Thus for example the plasma device 900 can be constructed such that the plasma source is accommodated in a plasma source unit of the plasma device 900 and the voltage source is accommodated in a main housing of the plasma device 900 and the plasma source unit is removably coupled to the main housing. In this way a plasma device 900 can for example contain the main housing and a series of plasma source units, each of which is suitable for a particular material to be treated.

The invention claimed is:

1. A plasma device for applying a cold atmospheric plasma to a surface to be treated, the plasma device comprising:

a housing, a plasma source arranged in said housing, and a voltage source for applying a voltage to said plasma source;

an actuator configured to activate said plasma source, provided that a distance between the plasma source and the surface to be treated lies within a predetermined distance;

said actuator having an adjustable and preloaded actuator element with at least one activation element, and a recording device configured to record a position of said actuator element at least when the distance between said plasma source and the surface to be treated lies within the predetermined distance.

2. The plasma device according to claim 1, which comprises a device selected from the group consisting of a spring, an elastic plastic element, a foam element, a rubber element, a pneumatic resetting facility, and a hydraulic resetting facility for preloading and resetting said actuator element.

3. The plasma device according to claim 2, wherein said elastic plastic element is a sealing lip.

4. The plasma device according to claim 1, wherein said recording device comprises at least one device selected from the group consisting of a proximity sensor, a contact sensor, a microswitch, a strain gauge, a magnetic sensor, and a light barrier.

5. The plasma device according to claim 4, wherein said recording device comprises a light barrier and said activation element has a chamfered flank, wherein said recording device is configured to determine a degree of coverage of the light barrier and thus a distance between said plasma source and the surface to be treated.

6. The plasma device according to claim 1, wherein said recording device comprises a light barrier arranged on a circuit board and said circuit board is formed with an opening that is crossed by the light barrier and into which said activation element engages, provided that the distance between the plasma source and the surface to be treated lies within the predetermined distance.

7. The plasma device according to claim 1, wherein the predefined distance lies within a range between 0 and 4 mm.

8. The plasma device according to claim 7, wherein the predefined distance lies within a range between 0 and 1 mm.

9. The plasma device according to claim 1, configured as a portable plasma device, and wherein said voltage source has a battery or a rechargeable battery.

10. The plasma device according to claim 1, configured specifically for treating at least one of textiles, leather, or plastic fibers.

* * * * *